United States Patent
Schincariol et al.

(10) Patent No.: US 11,102,277 B2
(45) Date of Patent: *Aug. 24, 2021

(54) SYSTEM AND METHOD FOR WORKFLOW ORCHESTRATION FOR USE WITH A CLOUD COMPUTING ENVIRONMENT

(71) Applicant: ORACLE INTERNATIONAL CORPORATION, Redwood Shores, CA (US)

(72) Inventors: Merrick Schincariol, Almonte (CA); Steven Vo, Ottawa (CA); Yaoping Wang, Ottawa (CA); Robert Campbell, Ottawa (CA)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/525,209

(22) Filed: Jul. 29, 2019

(65) Prior Publication Data

US 2019/0349421 A1 Nov. 14, 2019

Related U.S. Application Data

(63) Continuation of application No. 13/961,068, filed on Aug. 7, 2013, now Pat. No. 10,419,524.
(Continued)

(51) Int. Cl.
*H04L 29/08* (2006.01)
*G06F 9/50* (2006.01)

(52) U.S. Cl.
CPC ............ *H04L 67/10* (2013.01); *G06F 9/5072* (2013.01)

(58) Field of Classification Search
CPC ............................... H04L 67/10; G06F 9/5072
(Continued)

(56) References Cited

U.S. PATENT DOCUMENTS

| 7,996,488 B1 * | 8/2011 | Casabella ............. G06F 9/5038 709/217 |
| 8,190,459 B1 | 5/2012 | Fong et al. |

(Continued)

FOREIGN PATENT DOCUMENTS

| CN | 102546735 | 7/2012 |
| JP | 2011203894 | 10/2011 |

(Continued)

OTHER PUBLICATIONS

Gudenkauf, Stefan, Guido Scherp, André Höing, Wilhelm Hasselbring, and Odej Kao. "Workflow modeling for WS-BPEL-based service orchestration in SMEs." (2010): 185-192. (Year: 2010).*
(Continued)

*Primary Examiner* — Suraj M Joshi
*Assistant Examiner* — Melaku Y Habtemariam
(74) *Attorney, Agent, or Firm* — Tucker Ellis LLP

(57) ABSTRACT

A system and method for workflow orchestration for use with a cloud computing environment. Cloud environments, such as Oracle Public Cloud (OPC), provide a suite of applications, middleware, and database offerings that can be delivered to tenants in a self-service, elastically scalable, and secure manner. In accordance with an embodiment, the cloud environment can include a Platform as a Service (PaaS) environment, which provides a variety of services such as virtual assembly creation. A workflow orchestrator can be used to orchestrate operations between the cloud environment and the PaaS environment, e.g., by receiving a request from a tenant automation system, and coordinating the provisioning and deployment of virtual assemblies or
(Continued)

applications. A customer can interact with the PaaS environment, e.g., to request a service, deploy to the service, or monitor the service.

12 Claims, 10 Drawing Sheets

Related U.S. Application Data

(60) Provisional application No. 61/799,401, filed on Mar. 15, 2013, provisional application No. 61/698,462, filed on Sep. 7, 2012.

(58) Field of Classification Search
USPC .................................................. 709/201–203
See application file for complete search history.

(56) References Cited

U.S. PATENT DOCUMENTS

| | | |
|---|---|---|
| 8,346,895 B2 | 1/2013 | Cherdon et al. |
| 2007/0208587 A1 | 9/2007 | Sitaraman |
| 2007/0288258 A1* | 12/2007 | Beringer ............ G06Q 10/0633 705/7.27 |
| 2009/0080408 A1 | 3/2009 | Natoli et al. |
| 2010/0153482 A1 | 6/2010 | Kim et al. |
| 2011/0191383 A1* | 8/2011 | Addala .................. G06F 16/00 707/797 |
| 2011/0238458 A1 | 9/2011 | Purcell et al. |
| 2011/0238859 A1 | 9/2011 | Kitagata |
| 2011/0265164 A1 | 10/2011 | Lucovsky et al. |
| 2011/0320605 A1* | 12/2011 | Kramer ............... H04L 41/0843 709/226 |
| 2012/0054345 A1 | 3/2012 | Sahu et al. |
| 2012/0166967 A1 | 6/2012 | Deimbacher et al. |
| 2012/0185913 A1* | 7/2012 | Martinez ............. G06F 9/45558 726/1 |
| 2012/0203823 A1 | 8/2012 | Manglik et al. |
| 2012/0324069 A1* | 12/2012 | Nori ...................... G06F 9/5066 709/222 |
| 2013/0018693 A1 | 1/2013 | Dubbels et al. |
| 2013/0166703 A1 | 6/2013 | Hammer et al. |

FOREIGN PATENT DOCUMENTS

| | | |
|---|---|---|
| JP | 2011233146 | 11/2011 |
| WO | 2012006034 | 1/2012 |
| WO | 2012100750 | 8/2012 |
| WO | 2012101893 | 8/2012 |

OTHER PUBLICATIONS

"Accelerating Enterprise Cloud Infrastructure Deployments", 2011, 4 pages.
Chauhan, et al., "On-Demand Sourcing: Driving Costs Down and Value Up in a Period of Increased Business Volatility", Jun. 11, 2010, 5 pages.
"Cost Effective Security and Compliance with Oracle Database 11g Release 2", An Oracle White Paper, Mar. 2011, 14 pages.
"Creating a Self-Service Dev/Test Cloud: A Case Study from Oracle Product Development IT", An Oracle White Paper, Jul. 2011, 12 pages.
Glas, et al., "Achieving the Cloud Computing Vision", An Oracle White Paper in Enterprise Architecture, Oct. 2010, 22 pages.
Gulati, "Cloud Management Using Oracle Enterprise Manager 11g", An Oracle White Paper, Apr. 2010, 25 pages.
Habuka, et al., "Building of Private cloud with Eucalyptus", First Edition, Japan, Impress Corporation, Yoneichi Tsuchida, pp. 176, 179-180; Jun. 1, 2011, 3 pages.
Horn, et al., "An Approach to Dynamic Instance Adaption in Workflow Management Applications", Dec. 13, 2002. https://ccs.mit.edu/klein/cscw98/paper21/, 9 pages.
Joshi, et al., "Bridging the Divide between SaaS and Enterprise Datacenters", An Oracle White Paper, Feb. 2010, 18 pages.
Kumar, et al., "The Most Complete and Integrated Virtualization: From Desktop to Datacenter", An Oracle White Paper, Oct. 2010, 13 pages.
Mather, Tim et al., "Cloud Security and Privacy, An Enterprise Perspective on Risks and Compliance", Jan. 5, 2011, pp. 55-57, 7 pages.
McKendrick, "Privatizing the Cloud", Oct. 2010, 33 pages, IOUG Survey on Cloud Computing.
"Oracle Exadata Database Machine: Security Overview", 2011, 2 pages.
"Oracle Identity Management 11g", 2010, 4 pages.
"Oracle Offers ISVs Comprehensive Platform to Deliver SaaS Applications", 2008, 2 pages.
"Oracle Optimized Solution for Enterprise Cloud Infrastructure", An Oracle Technical White Paper, Jun. 2011, 32 pages.
Piech, "Platform-as-a-Service Private Cloud with Oracle Fusion Middleware", An Oracle White Paper, Oct. 2009, 20 pages.
"Reduce TCO and Get More Value from your X86 Infrastructure", 2011, 4 pages.
Silverstein, et al., "Architectural Strategies for IT Optimization: From Silos to Clouds", An Oracle White Paper on Enterprise Architecture, May 2010, 21 pages.
Thanawala, et al., "Oracle SaaS Platform: Building On-Demand Applications", An Oracle White Paper, Sep. 2008, 21 pages.
Venkataraman, et al., "Oracle's Cloud Solutions for Public Sector", An Oracle White Paper, Apr. 2011, 28 pages.
Wahl, et al., "Oracle Advanced Security with Oracle Database 11g Release 2", Oracle White Paper, Oct. 2010, 12 pages.
Wang, "Oracle Cloud Computing", An Oracle White Paper, Jun. 2011, 16 pages.
International Search Report and the Written Opinion of the International Searching Authority dated Dec. 12, 2013 for PCT Application No. PCT/US2013/058603, 9 pages.
Japanese Office Action for Japanese Patent Application No. 2015-531255, dated Jul. 18, 2017, 9 pages.
Chinese Patent Office, Office Action dated Aug. 2, 2017 for Chinese Patent Application No. 201380038782.1, 9 pages.
Japanese Office Action dated Mar. 6, 2018 for Japanese Patent Application No. 2015-531255, 8 pages.
Communication pursuant to Article 94(3) EPC, dated Oct. 19, 2018 for EP Application No. 13766769.7, 7 pages.
Japanese Office Action dated Dec. 4, 2018 for Japanese Patent Application No. 2015-531255, 8 pages.
Japanese Office Action for Japanese Patent Application No. 2015-531255, dated Jun. 4, 2019, 4 pages.
English Language Machine Translation of Japanese Office Action for Japanese Patent Application No. 2015-531255, dated Jun. 4, 2019, 4 pages.
European Patent Office, Summons to attend oral proceedings pursuant to Rule 115(1) EPC mailed Jan. 11, 2021 for EP Application No. 13766769.7, 10 pages.
Indian Patent Office, First Examination Report dated Jan. 31, 2020 for Indian Patent Application No. 9070/CHEN/2014, 7 pages.

* cited by examiner

SYSTEM AND METHOD FOR WORKFLOW ORCHESTRATION FOR USE WITH A CLOUD COMPUTING ENVIRONMENT

CLAIM OF PRIORITY

This application is a continuation of and claims the benefit of priority to U.S. Patent Application titled "SYSTEM AND METHOD FOR WORKFLOW ORCHESTRATION FOR USE WITH A CLOUD COMPUTING ENVIRONMENT", application Ser. No. 13/961,068, filed Aug. 7, 2013; which claims the benefit of priority to U.S. Provisional Patent Application titled "SYSTEM AND METHOD FOR WORKFLOW ORCHESTRATION FOR USE WITH A CLOUD COMPUTING ENVIRONMENT", Application No. 61/799,401, filed Mar. 15, 2013; and U.S. Provisional Patent Application titled "SYSTEM AND METHOD FOR PROVIDING A CLOUD COMPUTING ENVIRONMENT", Application No. 61/698,462, filed Sep. 7, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing environments, and in particular systems and methods for workflow orchestration for use with a cloud computing environment.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been previously provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications.

Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment).

Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer).

The above examples are provided to illustrate some of the types of environment within which embodiments of the invention can generally be used. In accordance with various embodiments, the systems and methods described herein can also be used with other types of cloud or computing environments.

SUMMARY

Described herein is a system and method for workflow orchestration for use with a cloud computing environment. Cloud environments, such as Oracle Public Cloud (OPC), provide a suite of applications, middleware, and database offerings that can be delivered to tenants in a self-service, elastically scalable, and secure manner. In accordance with an embodiment, the cloud environment can include a Platform as a Service (PaaS) environment, which provides a variety of services such as virtual assembly creation. A workflow orchestrator can be used to orchestrate operations between the cloud environment and the PaaS environment, e.g., by receiving a request from a tenant automation system, and coordinating the provisioning and deployment of virtual assemblies or applications. A customer can interact with the PaaS environment, e.g., to request a service, deploy to the service, or monitor the service.

DETAILED DESCRIPTION

As described above, a cloud computing environment (cloud environment, or cloud) can be implemented in a variety of different ways to best suit different requirements: for example, public cloud, private cloud, community cloud, or hybrid cloud. A cloud computing model enables some of those responsibilities which previously may have been previously provided by an organization's own information technology department, to instead be delivered as service layers within a cloud environment, for use by consumers (either within or external to the organization, according to the cloud's public/private nature).

Described herein are a variety of hardware and/or software components and features, which can be used in delivering an infrastructure, platform, and/or applications to support cloud computing environments. In accordance with various embodiments, the system can also utilize hardware and software such as Oracle Exalogic and/or Exadata machines, WebLogic and/or Fusion Middleware, and other hardware and/or software components and features, to provide a cloud computing environment which is enterprise-grade, enables a platform for development and deploying applications, provides a set of enterprise applications built on modern architecture and use cases, and/or provides flexible consumption choices.

Figure 1:
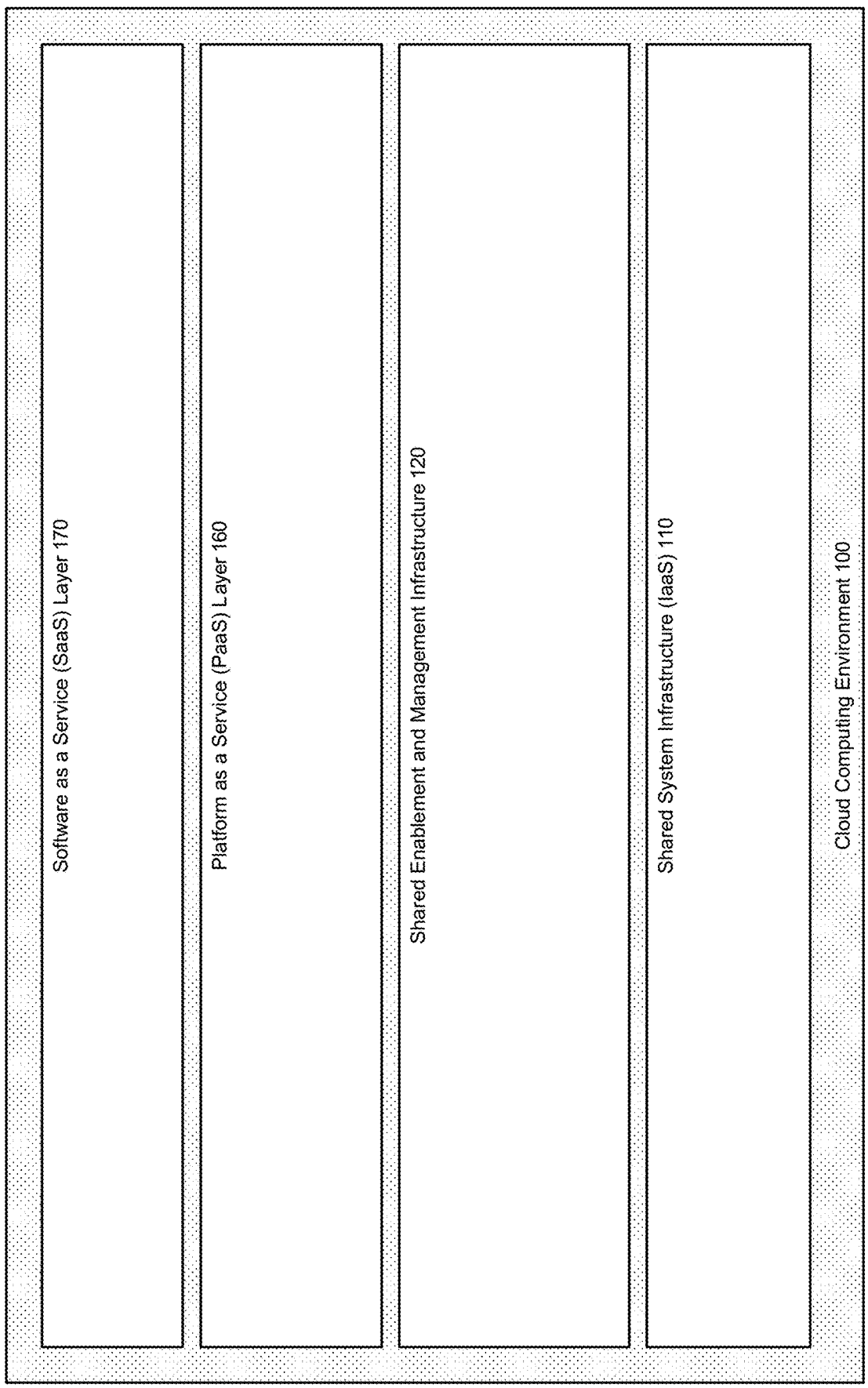
FIG. 1 illustrates a cloud computing environment including service layers, in accordance with an embodiment.

FIG. 1 illustrates a cloud computing environment including service layers, in accordance with an embodiment. As shown in FIG. 1, in accordance with an embodiment, a cloud computing environment (cloud environment, or cloud) 100 can generally include a combination of one or more Infrastructure as a Service (IaaS) layer 110, Platform as a Service (PaaS) layer 160, and/or Software as a Service (SaaS) layer 170, each of which are delivered as service layers within the cloud environment, and which can be used by consumers within or external to the organization, depending on the particular cloud computing model being used.

In accordance with an embodiment, the cloud computing environment can be implemented as a system that includes one or more conventional general purpose or specialized digital computers, computing devices, machines, microprocessors, memory and/or computer readable storage media, for example the computer hardware, software, and resources provided by Oracle Exalogic, Exadata, or similar machines.

As further shown in FIG. 1, in accordance with an embodiment, the cloud computing environment can include a shared enablement and managing infrastructure 120, which is described in further detail below, and which provides enablement and management tools that can be used to support the various service layers.

The example shown in FIG. 1 is provided as an illustration of a type of cloud computing environment in which embodiments of the invention can generally be used. In accordance with various embodiments, the systems and methods described herein can also be used with different and/or other types of cloud or computing environments.

Figure 2:
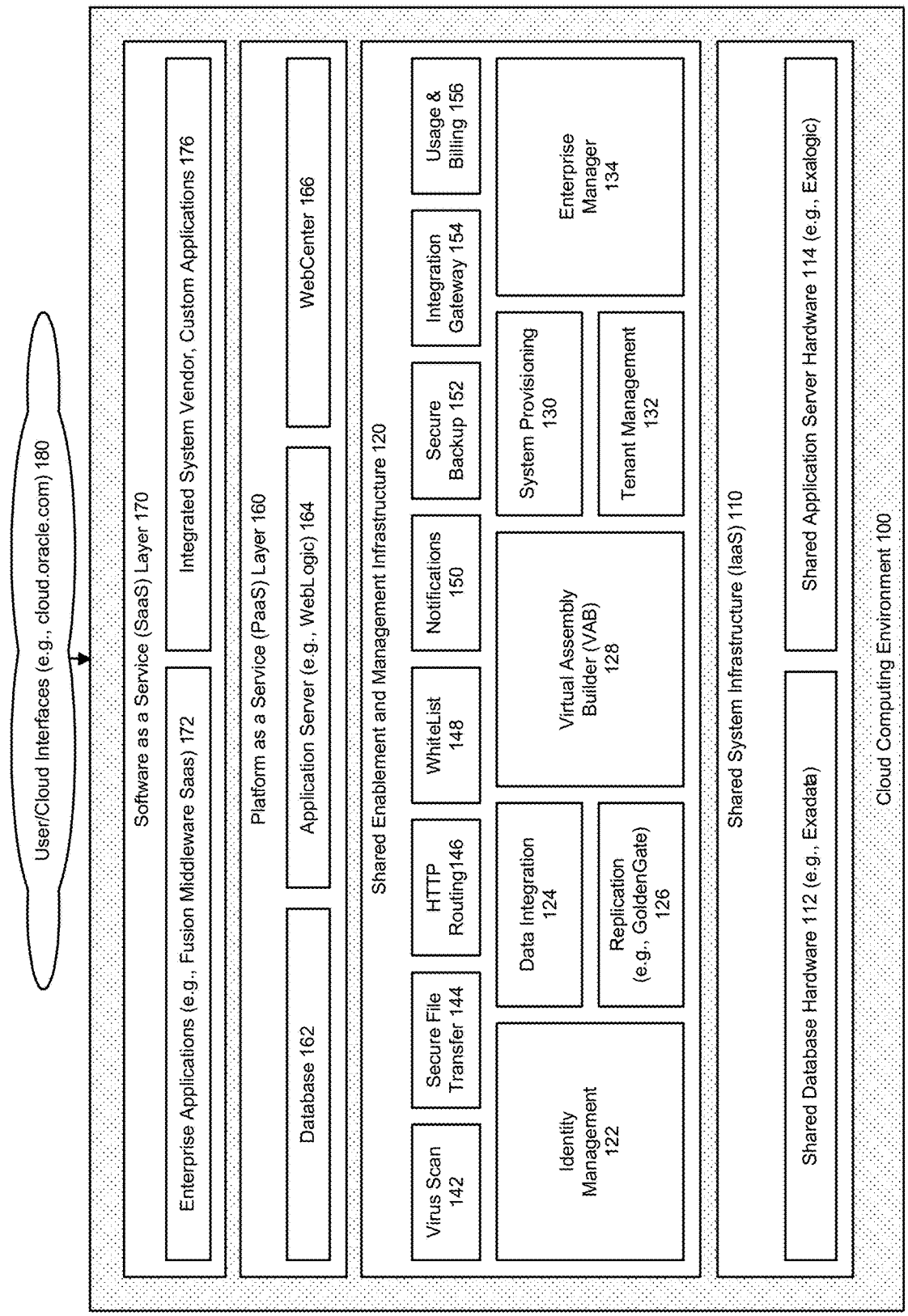
FIG. 2 further illustrates an environment, in accordance with an embodiment.

FIG. 2 further illustrates an environment, in accordance with an embodiment. As shown in FIG. 2, in accordance with an embodiment, each of the IaaS, PaaS, and/or SaaS layers can generally include a variety of components. For example, in accordance with an embodiment, the IaaS layer can include a shared database hardware (e.g., an Exadata machine) 112, and/or a shared application server hardware (e.g., an Exalogic machine). The PaaS layer can include one or more PaaS services, such as a database service 162, application service 164, and/or WebCenter service 166. The SaaS layer can include various SaaS services, such as enterprise applications (e.g., Oracle Fusion SaaS) 172, and/or ISV or custom applications 176, that can be accessed by one or more user/cloud interfaces 180.

As described above, in accordance with an embodiment, the cloud computing environment can also include a shared enablement and management infrastructure. For example, as shown in FIG. 2, the shared enablement and management infrastructure can include one or more identity management 122, data integration 124, replication (e.g., Oracle GoldenGate) 126, virtual assembly builder 128, system provisioning 130, tenant management 132, and/or enterprise manager components 134.

As further shown in FIG. 2, in accordance with an embodiment, the shared enablement and managing infrastructure can also include other components, such as virus scan 142, secure file transfer 144, HTTP routing 146, whitelist 148, notifications 150, secure backup 152, integration gateway 154, and/or usage & billing 156 components.

The example shown in FIG. 2 is provided as an illustration of some of the types of components which can be included in a cloud computing environment, or within a shared enablement and management infrastructure. In accordance with other embodiments, different and/or other types or arrangements of components can be included.

Workflow Orchestrator

Cloud environments, such as Oracle Public Cloud (OPC), provide a suite of applications, middleware, and database offerings that can be delivered to tenants in a self-service, elastically scalable, and secure manner.

In accordance with an embodiment, the cloud environment can interact with a Platform as a Service (PaaS) environment, which provides a variety of services such as virtual assembly creation. A workflow orchestrator can be used to orchestrate operations between the cloud environment and the PaaS environment, e.g., by receiving a request from a tenant automation system, and coordinating the provisioning and deployment of virtual assemblies or applications, including use of the shared enablement and management infrastructure.

In accordance with an embodiment, the workflow orchestrator can perform additional procedures or functions during its orchestration of the provisioning or deployment, e.g., scanning an application for viruses, or comparing the application being deployed against a whitelist of acceptable API calls. The workflow orchestrator can also enable creation and management of platform instances, each of which can include one or more application server (e.g., WebLogic server) instances, together with other resources that are useful for running applications (e.g., a database service), and which can be run on shared hardware resources.

In accordance with an embodiment, by providing a proxy acting as a public access point outside the firewall, which a cloud user can then interact with, the workflow orchestrator can also enable management by cloud users of their platform instances, together with any application server instances and other resources therein.

Figure 3:
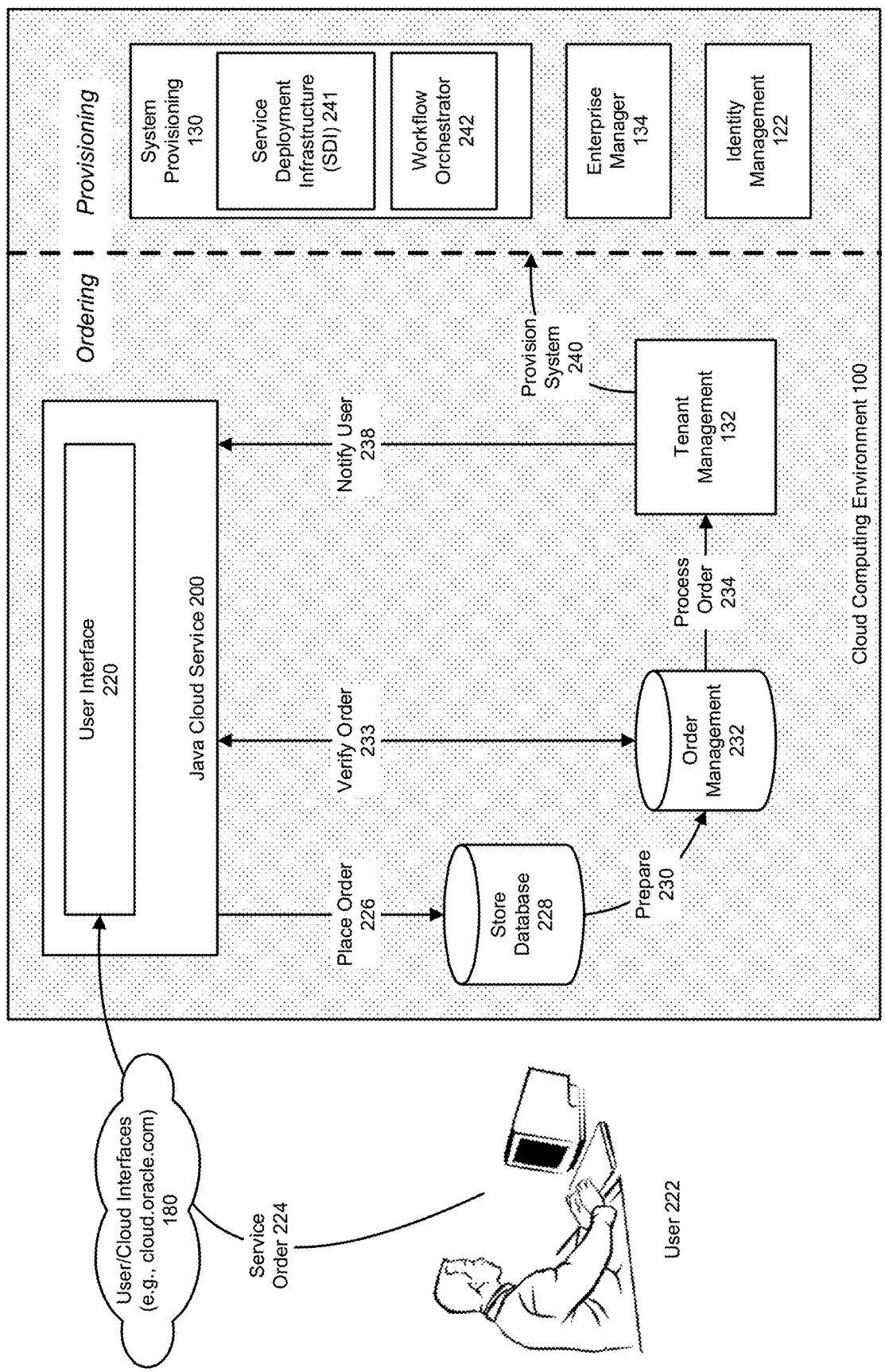
FIG. 3 illustrates an environment that includes a Java cloud service component, in accordance with an embodiment.

FIG. 3 illustrates an environment that includes a Java cloud service component, in accordance with an embodiment. As shown in FIG. 3, in accordance with an embodiment, a cloud environment which includes one or more services that can be customized for use with a cloud tenant (such as a Java cloud service 200) can be associated with a user interface 220 that enables a user 222 to either place an order 224 for a new instance of that service, and/or manage an existing service instance.

In accordance with an embodiment, ordering of a new instance of a service can include both ordering and provisioning phases.

During the ordering phase, the user can place an order 226, which is initially recorded in a store database 228, where it is prepared 230, and then provided to an order management component 232. After the user has verified the particulars of their order 233, the order can be processed 234 including, in accordance with an embodiment, passing the order to the tenant management component for provisioning 240. At various stages of the order process, the user can be notified as to their current order status 238.

Subsequently, during the provisioning phase, the system can call upon one or more system provisioning components including, in accordance with an embodiment, a service deployment infrastructure (SDI) 241, and a workflow orchestrator 242, to orchestrate the remaining steps of the provisioning process.

Figure 4:
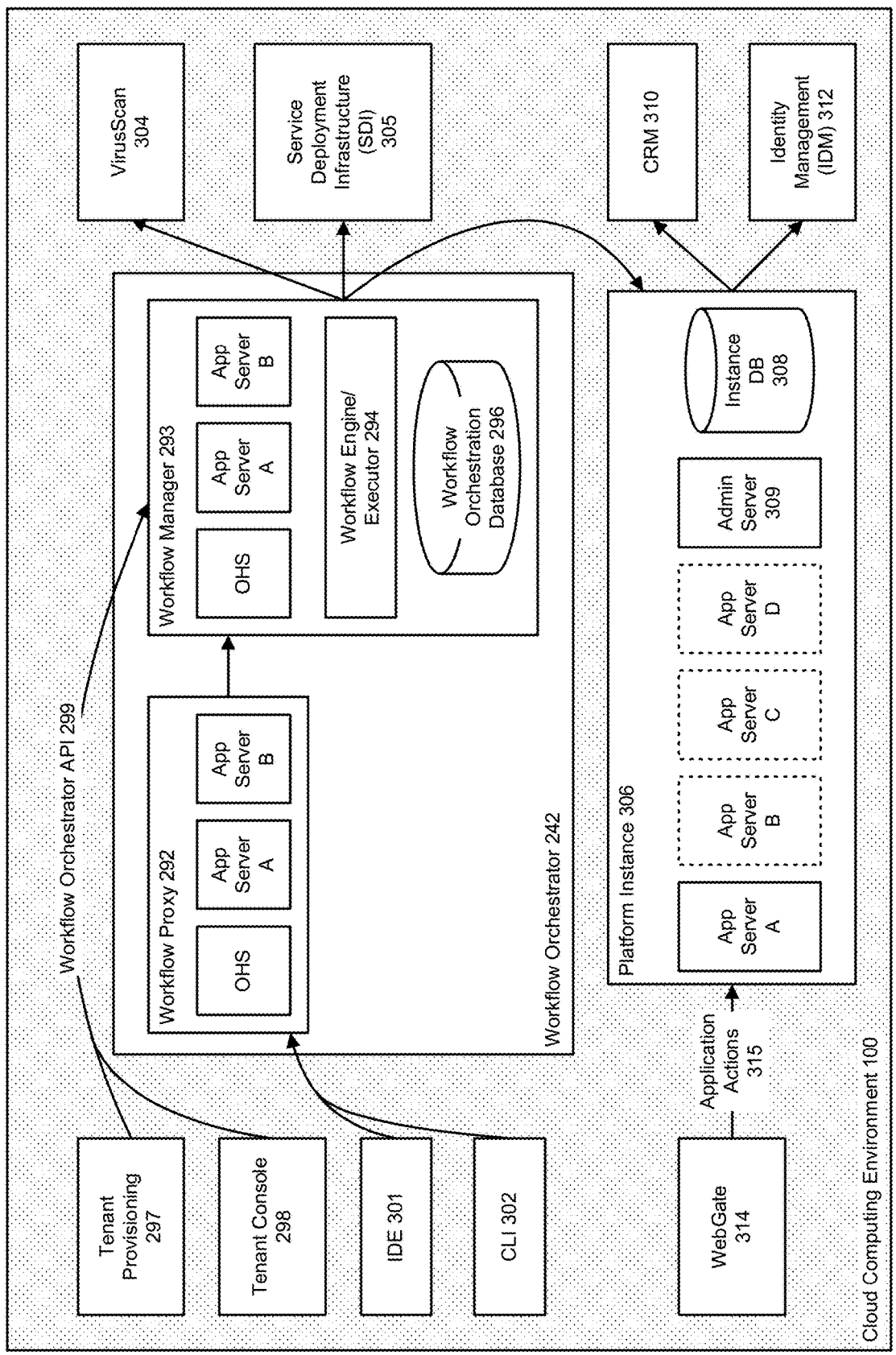
FIG. 4 illustrates a workflow orchestrator, in accordance with an embodiment.

FIG. 4 illustrates a workflow orchestrator, in accordance with an embodiment. As described above, a workflow orchestrator can be used to orchestrate operations, e.g., by receiving a request from a tenant automation system, and coordinating the provisioning and deployment of virtual assemblies or applications.

As shown in FIG. 4, in accordance with an embodiment, the workflow orchestrator 242 can include a workflow proxy component 292, and a workflow manager component 293, and can receive requests from tenant provisioning or other components or systems, to perform provisioning, modify a service in some way (e.g., associating another service with it) or other cloud operations, and to execute workflow jobs asynchronously.

In accordance with an embodiment, each job is recognized by the workflow orchestrator as an asynchronous process that executes one or more actions associated with a particular PaaS workflow. Each action is considered an atomic unit of work that is designed to create and manage resources within a public cloud runtime environment. Actions can be grouped into operations, which correspond to various functional capabilities of the workflow orchestrator, such as creating a service instance, or deploying an application. A job then executes the actions for a single operation, as part of a workflow.

In accordance with an embodiment, actions can be implemented as Java classes that extend a workflow orchestrator service provider interface (SPI). The classes implemented by the workflow orchestrator provide access to the runtime information and the services that are necessary to implement the actions.

In accordance with an embodiment, a service platform is a description of the operations and actions that are supported by a particular class of service. For example, a WebLogic service platform defines those operations and actions that are required to implement all of the workflow orchestrator service and application lifecycle operations within the context of a WebLogic environment. Each other/different type of service platform can be associated with its own/different types of actions, which can be configured via an XML document stored in the workflow orchestrator's shared configuration.

In accordance with an embodiment, the workflow manager is the entry point into the workflow orchestrator, providing secure access to PaaS operations via a workflow orchestrator application program interface (API), which in accordance with an embodiment can be provided as a REST API. Internally, the workflow manager controls job execution using a workflow engine/executor 294, and tracks jobs and other system state in a workflow orchestration database 296. The workflow orchestration database can also include information required to track domain entities, such as platform instances, deployment plans, applications, Weblogic domains, and alerts.

Each job is a sequence of actions specific to a particular PaaS workflow, e.g., the provisioning of a Java cloud service platform instance. Actions are typically performed in a sequential order, with failure in any step resulting in failure of the overall job. Depending on the service platform configuration, some workflow actions may delegate actions to external systems relevant to the workflow, such as an enterprise manager, or a virus scanning service.

In accordance with an embodiment, within the context of a public cloud, the workflow manager can be directly accessed via its workflow orchestrator API 299 by certain clients, such as a tenant provisioning 297, or tenant console 298 component, to drive provisioning and deployment operations respectively.

Other clients, for example JDeveloper or NetBeans IDE 301, or other command line interfaces (CLI) 302, can also be used to access lifecycle operations on the platform instances. However, for additional security, these clients will typically access the workflow manager via the workflow proxy. For example, in accordance with an embodiment, the workflow manager (including its OHS and application server instances) can be hosted in a WebLogic cluster running inside the firewall, while the workflow proxy (including its OHS and application server instances) can be provided as a public access point outside the firewall. Requests received by the proxy are then forwarded to the workflow manager.

In accordance with an embodiment, depending on the service platform configuration, the workflow orchestrator can utilize additional components or systems to carry out a workflow. For example, in the context of a Java cloud service, such additional components or systems can include:

Virus Scan 304: before a user's application is deployed to the cloud environment, their application can be scanned for viruses using a Virus Scan component.

Service Deployment Infrastructure (SDI) 305: an SDI component can provide access to assembly builder products, such as OVAB and OVM, for use in deploying or undeploying assemblies, or scaling appliances.

Customer Relationship Management (CRM) 310: when requested the workflow can associate a service, such as a Java cloud service, with a CRM instance.

Identity Management (IDM) 312: the workflow orchestrator can use identity management components, e.g., a service database containing information about tenants and their service subscriptions, to properly configure certain platform instances.

The above example is provided for purposes of illustration. In accordance with other embodiments and other workflows, additional or other components or systems can also be used to carry out a particular workflow.

As further shown in FIG. 4, in accordance with an embodiment, the workflow orchestrator can be used to coordinate provisioning of a platform instance 306.

For example, in the context of a Java cloud service, the resultant platform instance will contain all of those resources that are required to provide a WebLogic or other application server service, for a given tenant according to their order, including, e.g., an instance database 308, administration server 309, and one or more application servers.

Once instantiated and deployed to a cloud environment, a tenant user and/or their applications, can then access 315 their platform instance. Different types of access can be provided. In accordance with an embodiment, administration (e.g., monitoring, deploying/undeploying applications) can be performed by tenants through the proxy. Applications that tenants have deployed on a provisioned instance are owned by the tenants and could be anything for different purposes, e.g., providing custom access to their CRM instance; this can be provided through a service specific URL by tenant's customers, using, e.g., WebGate 314 for authentication and authorization.

Figure 5:
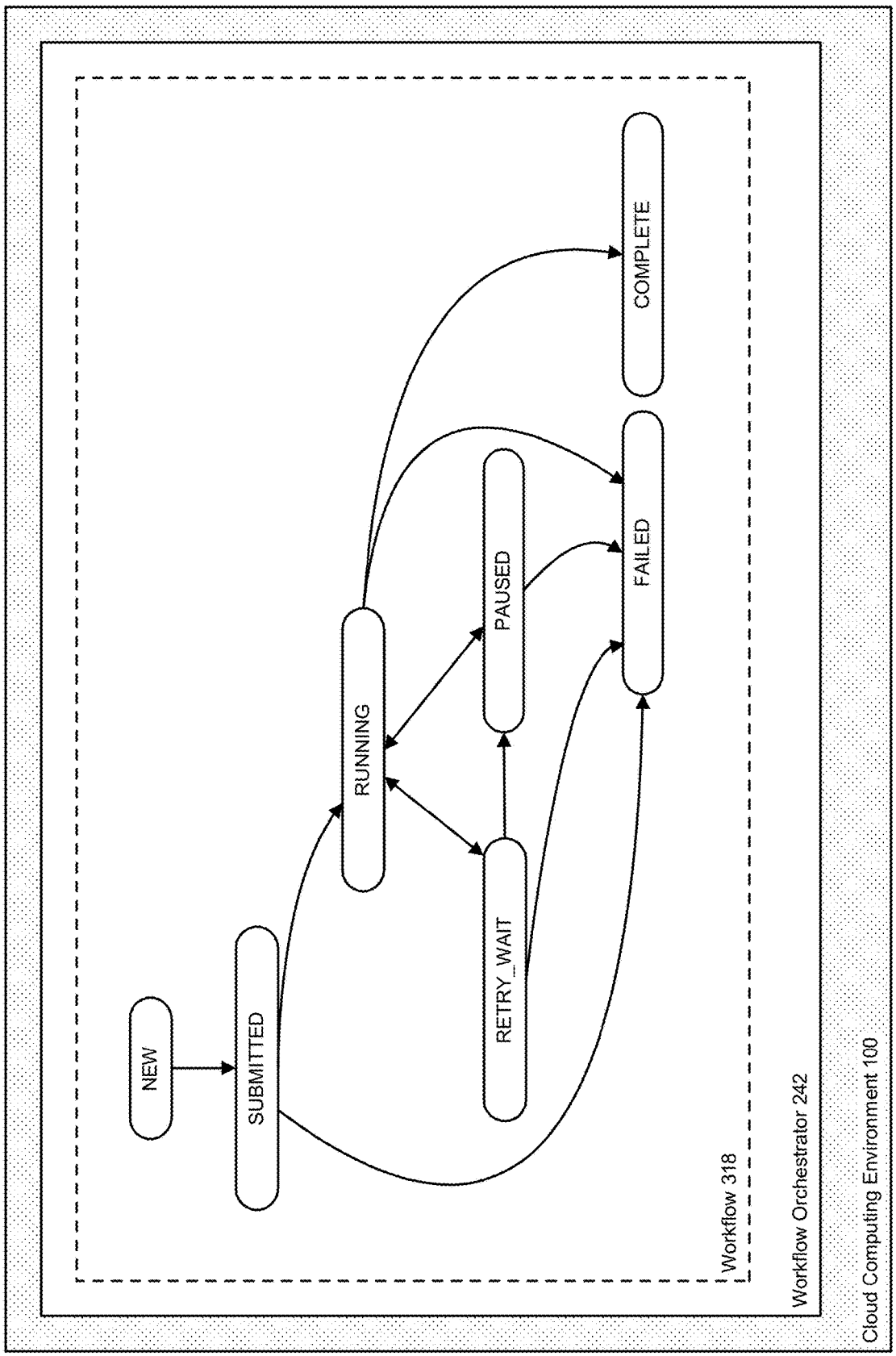
FIG. 5 illustrates example job status within a workflow orchestrator, in accordance with an embodiment.

FIG. 5 illustrates example job status within a workflow orchestrator, in accordance with an embodiment. As a job progresses, it transitions through several states. The current state and other information about a job can be queried in real time using the workflow orchestrator API. By way of example, as shown in FIG. 5, in accordance with an embodiment, the valid state transitions that may occur during execution of a job within a workflow 318 can include:

NEW: All jobs are created in the NEW state, which indicates that the job has been persisted in the workflow orchestration database, but no further action has been taken. NEW jobs will be moved automatically to SUBMITTED as the workflow orchestrator picks up the job and dispatches it to its work manager.

SUBMITTED: A job in the SUBMITTED state has been placed into a work manager queue, but has not yet been assigned a thread of execution. The length of time a job remains in this state is dependent on the overall load of the workflow orchestrator.

RUNNING: Jobs that are being actively executed by the work manager are placed into the RUNNING state. While in the RUNNING state, the workflow engine/executor iterates through the actions defined by an operation, executing them in sequence order.

RETRY_WAIT: When an action fails, it may indicate that a retry is possible. If configured to allow retries, the job will transition from RUNNING to RETRY_WAIT and the executing thread will terminate until a specified retry timeout has been reached. A job in RETRY_WAIT will transition back to RUNNING when work resumes.

PAUSED: An operator may move a job in the RUNNING or RETRY_WAIT state to the PAUSED state. A paused job is inactive and will remain in this state until an operator requests that it be resumed, at which point it will transition to RUNNING.

COMPLETE: The COMPLETE state is a terminal state that indicates a successful completion of all actions in the operation associated with the job.

FAILED: The FAILED state is a terminal state that indicates an action has encountered an unrecoverable failure, and was aborted.

In accordance with an embodiment, an action may return one of four possible outcomes: SUCCESS, SKIPPED, FAILED or FAILED_RETRY. SUCCESS and SKIPPED are successful results, while FAILED and FAILED_RETRY indicate error conditions. The action FAILED_RETRY may result in automatic retries of an action until it succeeds, or until a specified retry limit is reached. For an action to qualify for retry, it must be configured to allow retries in its service platform definition, and the action must return a FAILED_RETRY result. In this circumstance, the current job state will be persisted to the workflow orchestration database and the executing thread will terminate. When the retry timeout has been reached, the job will be resubmitted, where it will attempt to execute the failed action. Both the retry timeout and the retry limit are configured on a per-action basis; if an action reaches the retry limit it will result in the job moving to the PAUSED state.

In accordance with an embodiment, while in the RETRY_WAIT state, a job may be paused, allowing an operator to take manual corrective action. In this case the operator has the choice of resuming the job at the point of failure (retrying the failed action), or at the next action in the sequence, meaning that the operator has manually completed the steps that would have been performed by the action. Jobs in non-terminal states may be cancelled at any time. The action currently being executed will complete, at which point the thread will terminate and no further action will be taken for the job. While cancelling a job unblocks further operations on the same service instance, it can result in the system being left in an inconsistent state (e.g., service instances may be left with invalid data, or the domain for a service instance may have unactivated changes). Cancelling a job may require additional manual corrective action before the service instance can be used by customers.

The above examples of state transitions are provided by way of illustration. In accordance with other embodiments, the workflow orchestrator can recognize different and/or other types of state transitions.

Example use of Workflow Orchestrator with Java Cloud Service

In accordance with an embodiment, the features of the workflow orchestrator as described above can be used with any service that can be customized for use with a cloud tenant.

Figure 6:
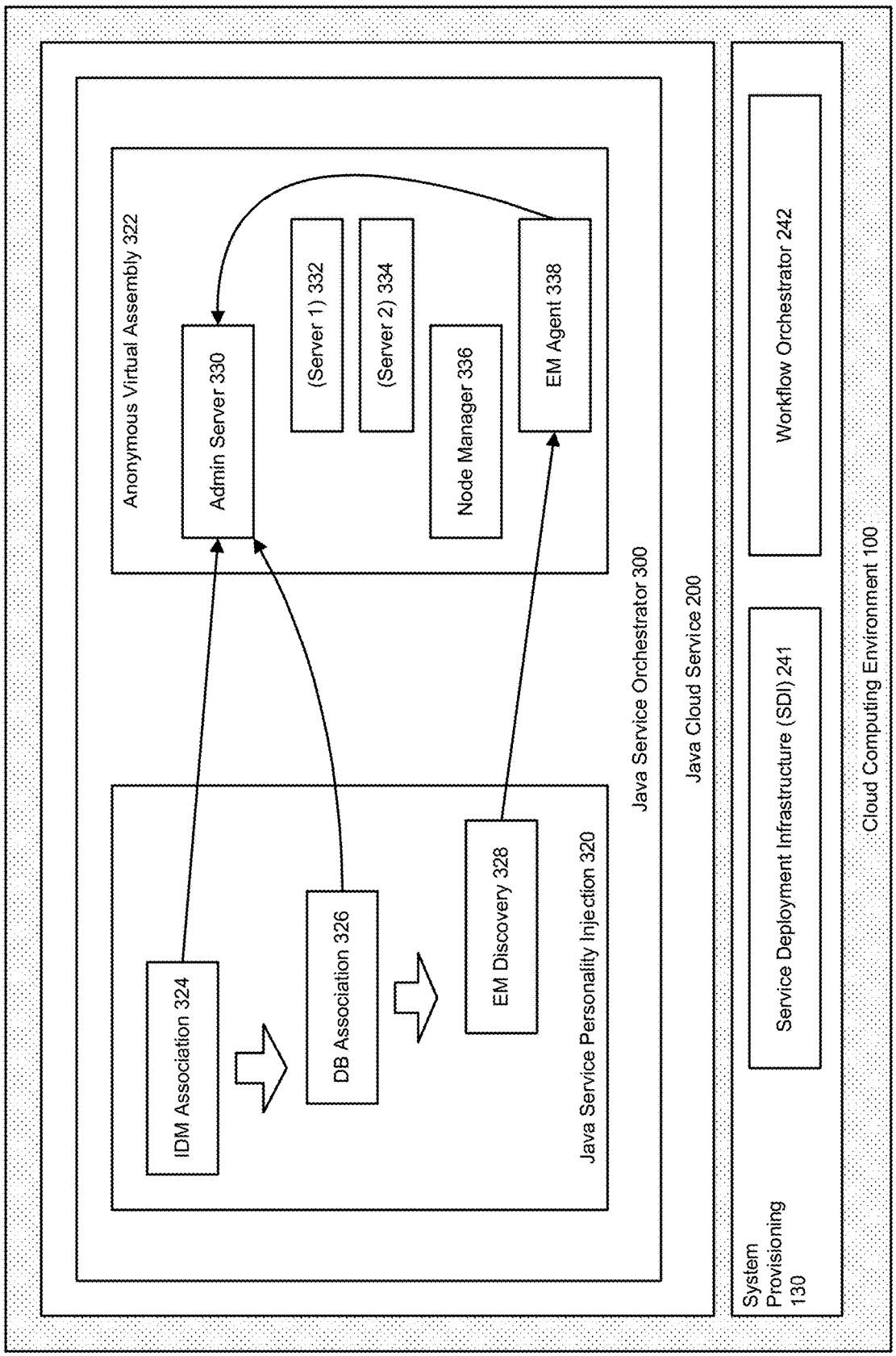
FIG. 6 illustrates Java cloud service personality injection, in accordance with an embodiment.

For example, FIG. 6 illustrates Java cloud service personality injection, in accordance with an embodiment. As described above, in accordance with an embodiment, a cloud environment which includes a service that can be customized for use with a cloud tenant, such as a Java cloud service, can be associated with a user interface that enables a user to place an order for a new instance of that service.

As shown in FIG. 6, in accordance with an embodiment, upon receiving an order, the service (in this example the Java cloud service) can utilize the workflow orchestrator to perform the tasks necessary to instantiate a platform instance for that particular service (i.e., in this example the workflow orchestrator acts as a Java service orchestrator 300).

In the example shown in FIG. 6, in order to create a Java cloud service platform instance, an anonymous assembly 322 is first received, e.g., from SDI and/or OVAB, which creates an anonymous assembly.

Then, a personality 320 is injected into the anonymous assembly, to configure the assembly for use by the tenant. In accordance with an embodiment, personalization can include, e.g., performing identity management (IDM) association 324, database association 326, and enterprise management discovery 328. Each of these steps can be coordinated by the workflow orchestrator, in combination with additional components or systems as appropriate.

The result of personality injection is a personalized assembly including, depending on the particular service requested, an administration server 330, one or more (e.g., WebLogic) application server instances 332, 334, a node manager 336, and an enterprise management agent 338.

Figure 7:
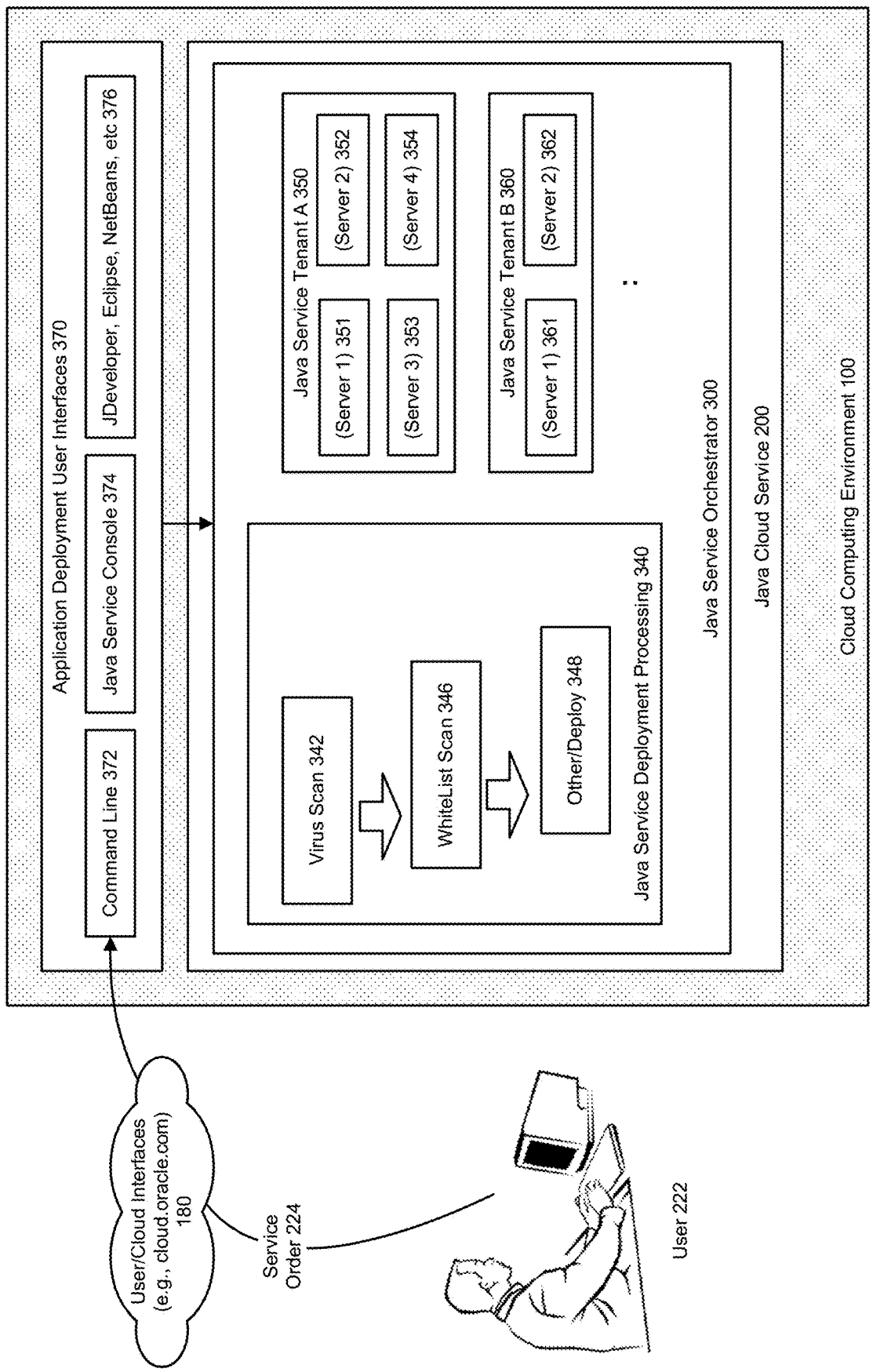
FIG. 7 illustrates Java cloud service deployment processing, in accordance with an embodiment.

FIG. 7 illustrates Java cloud service application deployment processing, in accordance with an embodiment. As shown in FIG. 7, in accordance with an embodiment, deployment of a Java cloud service application can include additional procedures or functions, such as scanning for viruses 342, or performing whitelist scanning 346, or other deployment-related functions 348. Each of these steps can again be coordinated by the workflow orchestrator, in combination with additional components or systems as appropriate.

As a result of deployment, one or more Java cloud service tenant applications 350, 360 can be deployed, for use with one or more server instances (in this example, Tenant A has four application server instances 351, 352, 352, 354; while Tenant B has two application server instances 361, 362), each of which tenant applications have been personalized and, e.g., scanned for viruses and whitelist conformation, or otherwise prepared according to workflow orchestrator, and the particular configuration of the platform instance.

In accordance with an embodiment, the system can also include one or more application deployment user interfaces 370, such as a command line interface 372, Java service console 374, JDeveloper 376, or other interfaces that allow the user to deploy their applications to, in this example a Java cloud service tenant.

The above examples, which illustrate the use of a workflow orchestrator with a Java cloud service, are provided by way of illustration. In accordance with other embodiments, the workflow orchestrator can be used with different and/or other types of services that can be customized for use with a cloud tenant.

Workflow Orchestrator API

In accordance with an embodiment, the workflow orchestrator API can include the following functions:

ListJobs: In accordance with an embodiment, this returns a list of active and recently completed jobs given a set of filtering criteria. Examples of the types of criteria parameters that can be supported include GroupName, InstanceName, ApplicationName, Limit and Start. By default, the workflow orchestrator returns the last, e.g. 100 jobs submitted to the system. The Limit query option can be used to increase this value, and the Start option can be used to specify a starting offset for the list.

DescribeJob: In accordance with an embodiment, this is used to request identifying information and current status of a job.

ListJobLogs: In accordance with an embodiment, this lists the set of log files associated with a job.

FetchJobLog: In accordance with an embodiment, this is used to download the contents of a log file associated with a job. The content type of the response varies with the log file type.

CancelJob: In accordance with an embodiment, this is used to cancel a running job. The current action being executed, if any, will complete before the job terminates.

PauseJob: In accordance with an embodiment, this pauses a running job. The job to be paused must be in RUNNING or RETRY_WAIT state.

ResumeJob/ResumeJobNextAction: In accordance with an embodiment, this resumes a previously paused job. The job to be resumed must be in the PAUSED state. If a NextAction query option is specified, then the job will resume at the next action of the sequence, skipping the action where it was paused.

The above examples of workflow orchestrator API functions are provided by way of illustration. In accordance with other embodiments, the workflow orchestrator API can recognize different and/or other types of functions.

Figure 8:
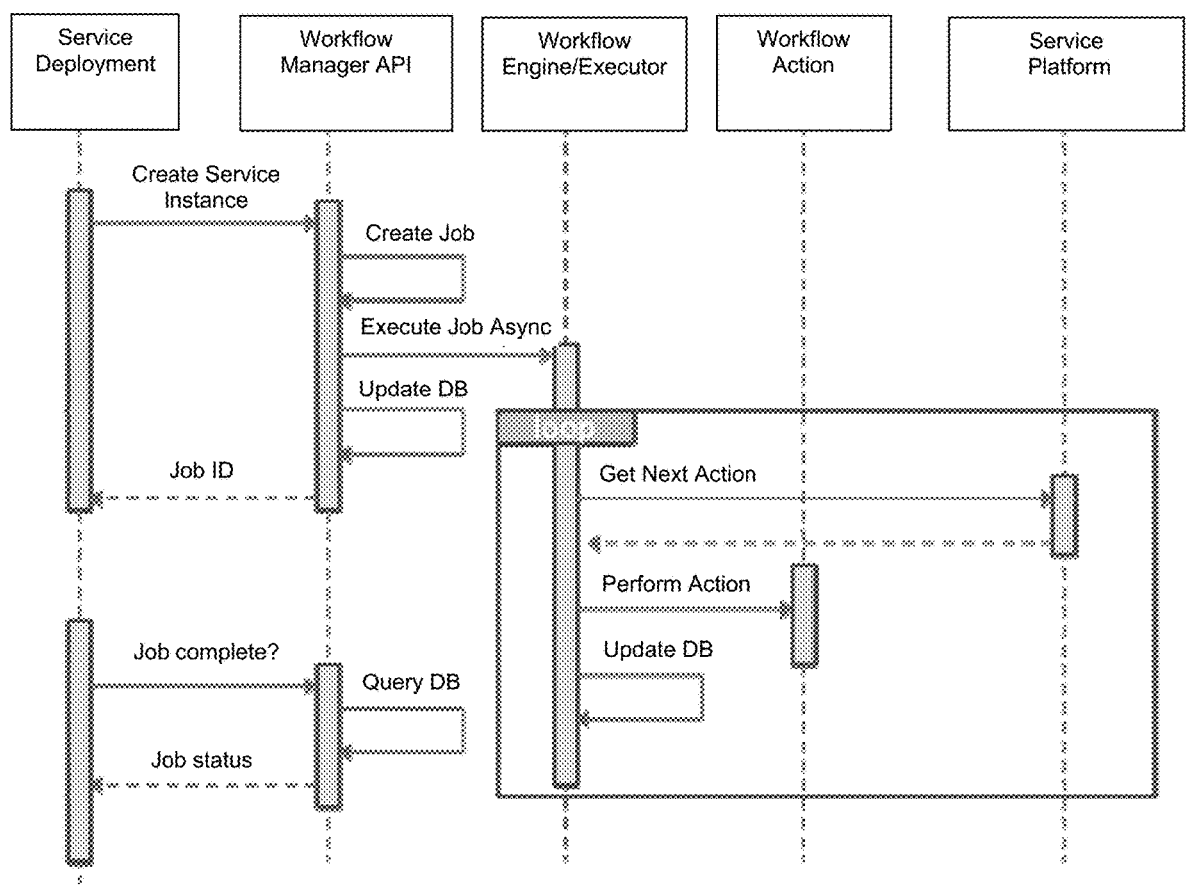
FIG. 8 illustrates an example of a workflow orchestrator job sequence diagram for platform instance provisioning, in accordance with an embodiment.

FIG. 8 illustrates an example of a workflow orchestrator job sequence diagram for platform instance provisioning, in accordance with an embodiment.

As shown in FIG. 8, platform instance provisioning 311 can be realized via a create platform instance operation using the workflow orchestrator API. In the context of a public cloud, a service instance corresponds to a workflow orchestrator platform instance. A platform instance is assigned a unique identifier that must be used on all subsequent operations related to this instance. The platform deployment descriptor provided to the create platform instance action allows for properties to be set that modify the configuration of the platform instance to meet the subscription requirements of the tenant.

Figure 9:
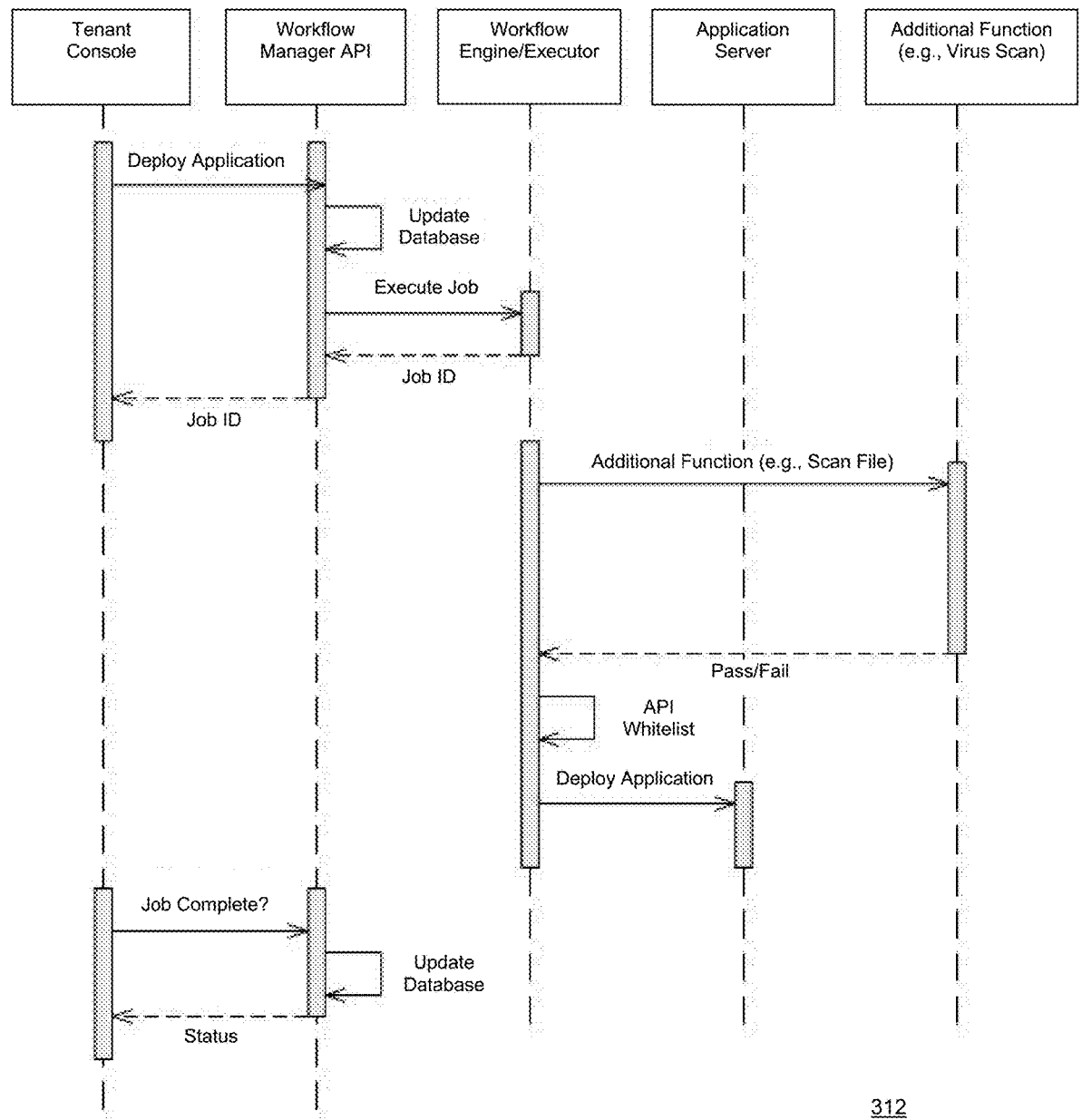
FIG. 9 illustrates an example of a workflow orchestrator job sequence diagram for application installation or update, in accordance with an embodiment.

FIG. 9 illustrates an example of a workflow orchestrator job sequence diagram for application installation or update, in accordance with an embodiment.

As shown in FIG. 9, application installation or update can be realized using via an install application operation 312, which deploys an application to a running WebLogic server after validating that the application archive meets the security requirements of the public cloud (e.g., virus scanning, or whitelist). The application deployment descriptor provided to the install application action allows for properties to be set that modify the configuration of the application to meet the subscription requirements of the tenant.

The example workflow orchestrator job sequence diagrams illustrated in FIGS. 8 and 9 are provided by way of illustration. In accordance with other embodiments, the workflow orchestrator can perform different and/or other types of job sequence, including other types of job sequence to perform platform instance provisioning and/or application installation.

Figure 10:
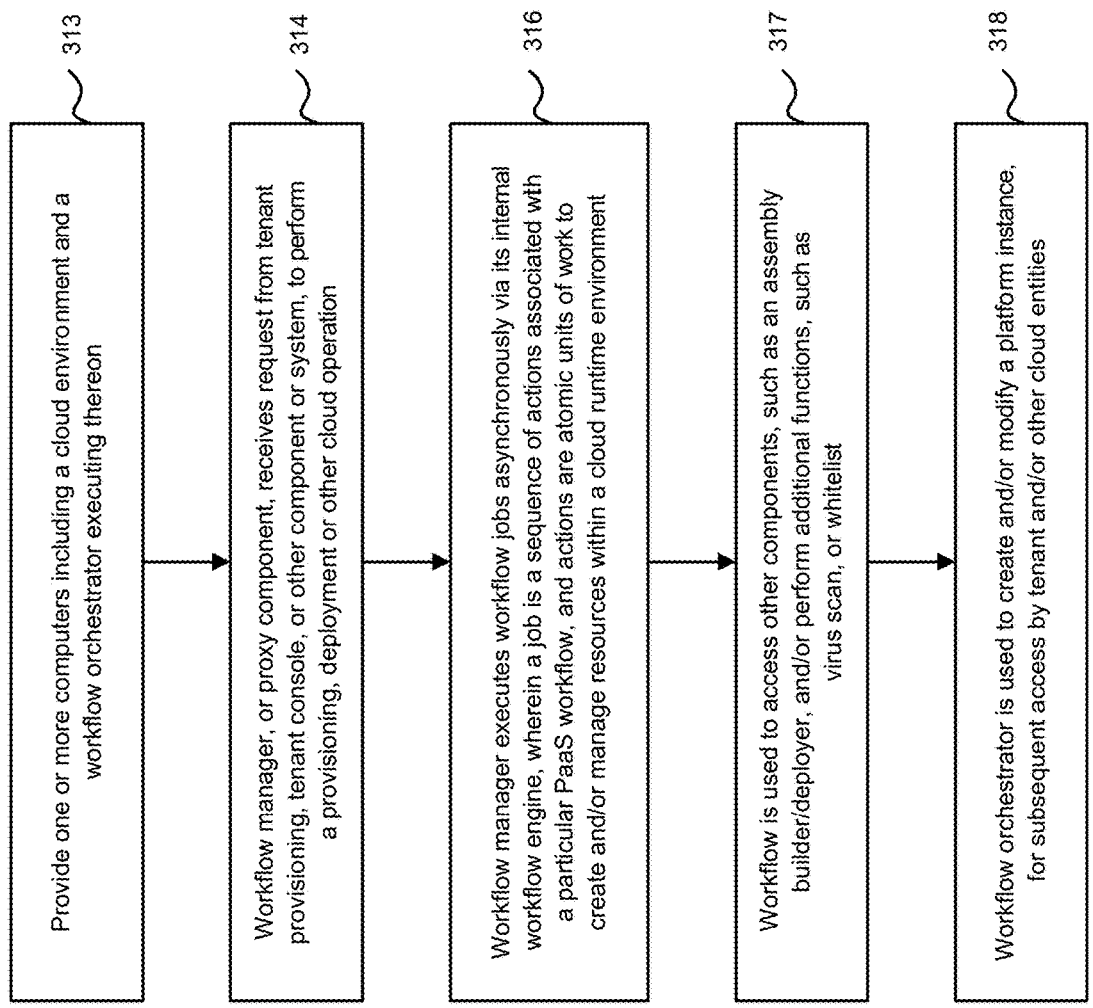
FIG. 10 is a flowchart of a process for use with an environment that includes a workflow orchestration component, in accordance with an embodiment.

FIG. 10 is a flowchart of a process for use with an environment that includes a workflow orchestration component, in accordance with an embodiment. As shown in FIG. 10, at step 313, one or more computers are provided, including a cloud environment and a workflow orchestrator executing thereon.

At step 314, a workflow manager, or proxy component, receives a request from a tenant provisioning, tenant console, or another component or system, to perform a provisioning, deployment or other cloud operation.

At step 316, the workflow manager executes workflow jobs asynchronously via its internal workflow engine/executor, wherein a job is a sequence of actions associated with a particular PaaS workflow, and actions are atomic units of work to create and/or manage resources within a cloud runtime environment.

At step 317, the workflow is optionally used to access other components, such as an assembly builder/deployer, and/or perform additional functions, such as virus scan, or whitelist.

At step 318, the workflow orchestrator is used to create and/or modify a platform instance, for subsequent access by tenant and/or other cloud entities.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A non-transitory computer readable medium, including instructions stored thereon which when read and executed by one or more computers cause the one or more computers to perform the steps comprising:
   providing, at one or more computers, a cloud environment executing thereon; and
   providing a workflow orchestrator for use in orchestrating workflow operations associated with platform instances, including a workflow manager that executes workflow jobs asynchronously via its internal workflow engine;
   wherein a job is a sequence of actions associated with a particular workflow, and actions are atomic units of work to create and/or manage resources within a cloud runtime environment; and
   wherein in response to receiving a request to instantiate a platform instance of a requested service, the workflow orchestrator:
      assigns an identifier to the platform instance for use with subsequent workflow operations related to the platform instance;
      executes one or more actions defined by the workflow operations, to
         receive an assembly to be associated with the requested service, and
         configure the assembly to create a personalized assembly that provides the requested service; and
      deploys the personalized assembly to the cloud computing environment, where it is made accessible as the platform instance of the requested service.

2. The non-transitory computer readable medium of claim 1, wherein the workflow orchestrator further includes a workflow proxy that receives request from a tenant provisioning, tenant console, or another component or system, to perform a provisioning, deployment or other cloud operation.

3. The non-transitory computer readable medium of claim 1, wherein the workflow is used to one of access other components, such as an assembly builder/deployer, and/or perform additional functions, such as virus scan, or whitelist.

4. The non-transitory computer readable medium of claim 1, wherein the workflow orchestrator is used to create and/or modify a platform instance, for subsequent access by tenant and/or other cloud entities.

5. A system for workflow orchestration with a cloud computing environment, comprising:
   one or more computers, that provide access to a cloud computing environment; and
   a workflow orchestrator that includes an application program interface that provides access to workflow operations associated with platform instances, and a workflow manager that executes the workflow operations via a workflow engine of the workflow manager;
   wherein the workflow manager receives requests to perform provisioning or modification of instances of a service including executing one or more actions associated with a particular workflow;
   wherein the workflow orchestrator operates to instantiates a platform instance of a service in response to a request, including:
      receiving, at the application program interface, the request to instantiate the instance of the requested service;
      assigning an identifier to the platform instance for use with subsequent workflow operations related to the platform instance; and
      performing, by the workflow manager, one or more actions defined by the workflow operations, to:
         receive a configurable assembly associated with the requested service;
         configure the assembly to create a personalized assembly that provides the requested service; and
         deploy the personalized assembly associated with the service to the cloud computing environment, to be made accessible as the platform instance of the requested service.

6. The system of claim 5, wherein the cloud computing environment interacts with a Platform as a Service (PaaS) environment, and wherein the workflow orchestrator orchestrates operations between the cloud computing environment and the PaaS environment.

7. The system of claim 6, wherein the workflow manager receives the requests from tenant provisioning or other components or systems, to perform provisioning or modification of service instances within the cloud computing environment.

8. The system of claim 5, wherein the system enables receipt of an order for a new instance of a service, and/or manage an existing service instance; wherein during an ordering phase, the order is received, and wherein during a provisioning phase, the workflow orchestrator is called to orchestrate the provisioning process.

9. A method of orchestrating a workflow with a cloud computing environment, comprising:
   providing, at one or more computers, access to a cloud computing environment; and
   providing, by a workflow orchestrator, an application program interface that provides access to workflow operations associated with platform instances, and a workflow manager that executes the workflow operations via a workflow engine of the workflow manager;
   wherein the workflow manager receives requests to perform provisioning or modification of instances of a service including executing one or more actions associated with a particular workflow;
   wherein the workflow orchestrator operates to instantiates a platform instance of a service in response to a request, including:
      receiving, at the application program interface, the request to instantiate the instance of the requested service;

assigning an identifier to the platform instance for use with subsequent workflow operations related to the platform instance; and performing, by the workflow manager, one or more actions defined by the workflow operations, to:
receive a configurable assembly associated with the requested service;
configure the assembly to create a personalized assembly that provides the requested service; and
deploy the personalized assembly associated with the service to the cloud computing environment, to be made accessible as the platform instance of the requested service.

10. The method of claim 9, wherein the cloud computing environment interacts with a Platform as a Service (PaaS) environment, and wherein the workflow orchestrator orchestrates operations between the cloud computing environment and the PaaS environment.

11. The method of claim 10, wherein the workflow manager receives the requests from tenant provisioning or other components or systems, to perform provisioning or modification of service instances within the cloud computing environment.

12. The method of claim 9, further comprising receiving an order for a new instance of a service, and/or to manage an existing service instance; wherein during an ordering phase, the order is received, and wherein during a provisioning phase, the workflow orchestrator is called to orchestrate the provisioning process.

* * * * *